United States Patent [19]
Penman et al.

[11] Patent Number: 5,618,658
[45] Date of Patent: Apr. 8, 1997

[54] PROCESS FOR PRODUCING AN AMMONIUM THIOSULFATE PRODUCT

[75] Inventors: Malcolm S. Penman, Gurnee, Ill.; Edward C. Saunders, Oakland; Peter R. Wardle, Wanaque, both of N.J.

[73] Assignee: Fuji Hunt Photographic Chemicals, Inc., Paramus, N.J.

[21] Appl. No.: 520,212

[22] Filed: Aug. 28, 1995

Related U.S. Application Data

[62] Division of Ser. No. 394,167, Feb. 22, 1995, abandoned.

[51] Int. Cl.⁶ ............................................. G03C 5/38
[52] U.S. Cl. ..................... 430/455; 430/393; 430/458; 430/460
[58] Field of Search ......................... 430/393, 455, 430/458, 460

[56] References Cited

U.S. PATENT DOCUMENTS

| | | | |
|---|---|---|---|
| 2,203,903 | 6/1940 | Ham | 430/453 |
| 2,898,190 | 8/1959 | Grosskinsky et al. | 423/545 |
| 3,345,131 | 10/1967 | Ingraham | 423/514 |
| 3,350,168 | 10/1967 | Ziegler | 423/265 |
| 3,431,070 | 3/1969 | Keller | 423/514 |
| 3,512,929 | 5/1970 | Mack | 423/514 |
| 3,937,793 | 2/1976 | Metzger et al. | 423/514 |
| 4,378,339 | 3/1983 | Brinkman et al. | 423/265 |
| 4,478,807 | 10/1984 | Ott | 423/514 |
| 4,493,337 | 1/1985 | Every et al. | 423/545 |
| 4,816,384 | 3/1989 | Fruge et al. | 430/465 |
| 5,055,384 | 10/1991 | Kühnert | 430/450 |
| 5,135,840 | 8/1992 | Reuter et al. | 430/458 |
| 5,330,544 | 7/1994 | Thomson et al. | 23/313 |
| 5,378,588 | 1/1995 | Tsuchiya | 430/458 |
| 5,400,105 | 3/1995 | Koboshi et al. | 354/324 |
| 5,409,805 | 4/1995 | Haraguchi et al. | 430/458 |
| 5,452,045 | 9/1995 | Kobashi et al. | 430/398 |

FOREIGN PATENT DOCUMENTS

| | | |
|---|---|---|
| 1287326 | 8/1972 | United Kingdom . |
| 1310242 | 3/1973 | United Kingdom . |

*Primary Examiner*—Hoa Van Le
*Attorney, Agent, or Firm*—Burns, Doane, Swecker & Mathis

[57] ABSTRACT

A substantially sulfur-free ammonium thiosulfate containing product can be produced by spray drying an aqueous solution containing ammonium thiosulfate and effective stabilizing amounts of both a carbonate component and a sulfite component under effective conditions to provide a substantially sulfur-free product. The carbonate component is selected from among ammonium carbonate or bicarbonate, an alkali metal carbonate or bicarbonate, or an alkaline metal carbonate or bicarbonate while the sulfite component is an ammonium sulfite or bisulfite, alkali metal sulfite or bisulfite, or an alkaline metal sulfite or bisulfite.

16 Claims, 1 Drawing Sheet

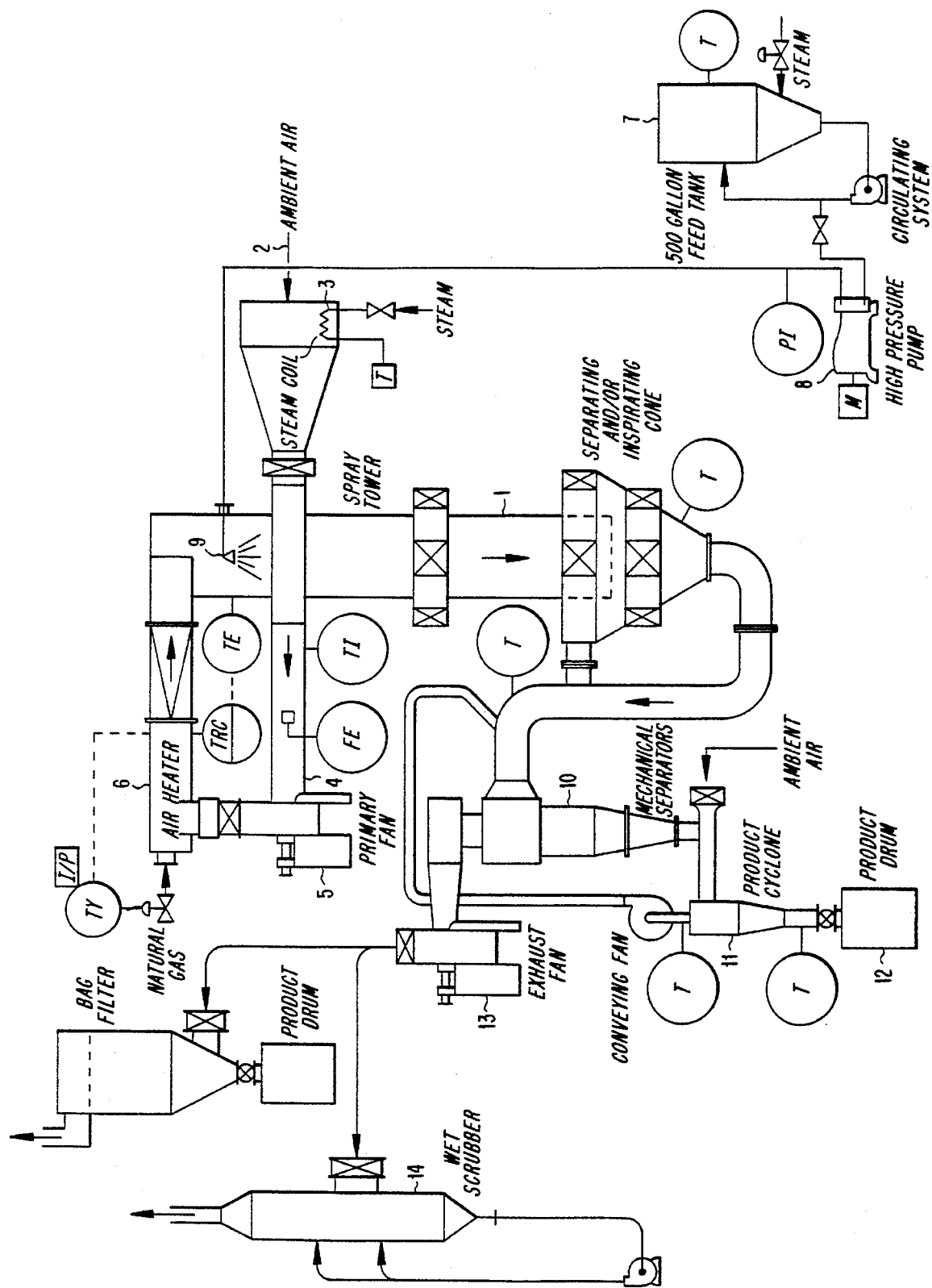

5,618,658

PROCESS FOR PRODUCING AN AMMONIUM THIOSULFATE PRODUCT

This application is a divisional of application Ser. No. 08/394,167, filed Feb. 22, 1995, abandoned.

FIELD OF THE INVENTION

This invention relates to an improved ammonium thiosulfate containing product which is substantially sulfur-free, and in particular, photographic fixer products containing such ammonium thiosulfate. In one aspect, an economical, rapid spray-drying process for converting commercially available ammonium thiosulfate containing aqueous solutions, directly to a substantially sulfur-free powder, without the necessity of precipitation or crystallization, is provided.

BACKGROUND OF THE INVENTION

Ammonium thiosulfate, (hereafter "ATS"), is typically prepared on a commercial scale by gas injection of sulfur dioxide and ammonia into an aqueous solution. See, for example, GB Patent No. 1287326; and U.S. Pat. Nos. 2,315,534; 2,412,607; 3,431,070; 3,473,891; 3,493,337; 3,524,724; 3,937,793; and 4,478,807. The resulting aqueous solution of ATS has found considerable use as a photographic fixative or a component thereof.

One important requirement for photographic fixers is that the ATS be sulfur-free because sulfur is insoluble, and any appreciable sulfur concentration would create a turbid solution and leave an objectionable residue on the photographic film and paper drying processes. ATS, further, tends to decompose into sulfur (and other compounds) upon exposure to heat and humidity. Thus, such decomposition needs to be avoided if the ATS-containing material is to be used in a photographic fixer environment.

Recently, the art has sought to provide dry, e.g., powder, formulations of photographic fixers in convenient packaging sizes, which formulations contain solid crystalline ATS. The source of the crystalline ATS is derived by precipitation from conventional aqueous solutions containing ATS. Such precipitation techniques suffer from a number of disadvantages including being slow, laborious, costly, and incurring problems in recycling or disposing of mother liquor remaining from the crystallization process.

Moreover, because ATS decomposition into, e.g., sulfur increases significantly at elevated temperatures, typical processes for accelerating the recovery of ATS crystalline solid, e.g., by the application of various drying processes at elevated temperatures, are at best problematic and heretofore have not achieved satisfactory results, particularly on a commercially acceptable scale.

Several approaches have been tried to mitigate ATS decomposition in these preparation techniques while optimizing the production of the dry solid. None, however, has proven entirely satisfactory.

Metzger, U.S. Pat. No. 3,937,793, discloses a complex process of reacting ammonia, oxygen, and sulfur dioxide in an ATS solution to form ammonium bisulfite and ammonium sulfite and then converting the intermediate bisulfite and sulfite to ATS by heating followed by crystallization.

Ingraham, U.S. Pat. No. 3,345,131, discloses that solid ATS can be stabilized by high pressure compression into briquettes. However, the product of this process would not dissolve as rapidly as would be required of a powder fixative mixture.

Brinkman, U.S. Pat. No. 4,378,339, discloses a somewhat moist ATS that appears to be more stable than anhydrous ATS but would not meet the flowability criteria of today's marketplace.

Ziegler, U.S. Pat. No. 3,350,168, discloses that the decomposition of anhydrous, crystalline ATS can be prevented by the addition of 0.01 to 10% of a second ammonium salt sufficiently volatile or unstable to provide an ammonia atmosphere surrounding the ATS. This patent further discloses that heating the thus preserved ATS to 220° F. in a closed bottle did not cause any noticeable decomposition.

Mack, U.S. Pat. No. 3,512,929, discloses that sodium thiosulfate when admixed with crystalline ATS has a stabilizing effect presumably by removing the last traces of water from the ATS.

GB 1310242 to Hoechst discloses a method for stabilizing crystalline ATS and ATS aqueous solutions using 0.1 to 8.0% (w/w) additions of sodium sulfite and 0.5 to 3.5% (w/w) additions of dicyanodiamide.

Although these aforementioned attempts at stabilizing ATS solid have met with varying degrees of success, no commercially viable means of producing dry, freely flowable, sulfur-free ATS powder has been accomplished.

Another technique for manufacturing a solid photographic fixer is the granulation technique described by Kuhnert in U.S. Pat. No. 5,055,384. The Kuhnert patent discloses a process for preparing a flowable ATS-based fixer granulate comprising milling all of the fixer powder ingredients, including precipitated, crystalline ATS; then introducing the solid blend into a fluidized bed, contacting the fluidized bed with water, heating the bed to 60° C. for a short period under atmospheric pressure, followed by vacuum drying at room temperature. However, as is apparent, the process employs precipitated ATS whose disadvantages were discussed earlier.

Thus, the need still exists for a process for producing a dry product containing ATS which is not subject to the foregoing disadvantages and in particular the problems associated with decomposition.

SUMMARY OF THE INVENTION

Among other aspects, the present invention is based on the surprising discovery that an ATS-containing product which is substantially free from sulfur and other undesirable products, can be effectively prepared from commercially available, inexpensive, aqueous solutions containing ATS.

In one aspect, the present invention relates to an ATS-containing product useful in forming fixing solutions, which comprises ammonium thiosulfate, at least one carbonate component selected from among ammonium carbonate or bicarbonate, an alkali metal carbonate or bicarbonate, or an alkaline earth metal carbonate or bicarbonate, and at least one sulfite component selected from among ammonium sulfite or bisulfite, an alkali metal sulfite or bisulfite, or an alkaline earth metal sulfite or bisulfite, wherein the product is in particle form and is substantially sulfur-free.

In another aspect, the present invention relates to a process comprising:

(a) providing an aqueous solution containing ATS and effective stabilizing amounts of: (i) the at least one carbonate component; and (ii) the at least one sulfite component; and (b) spray drying the solution under conditions effective to provide a substantially sulfur-free product.

Among other aspects, the present invention relates to an aqueous solution for use in the process, an improved ATS-containing product produced by this process, as well as photographic fixers including this product.

BRIEF DESCRIPTION OF THE DRAWINGS

The FIGURE illustrates one spray drying arrangement, i.e., a Swenson Power Dryer, which can be employed in the process of the present invention.

DETAILED DESCRIPTION OF THE PREFERRED EMBODIMENTS

As discussed above, the present invention seeks to provide an ATS-containing product which is capable of being employed in photographic fixer products, e.g., fixers, bleach-fixers and the like.

The ATS-containing product of the present invention is in particle form, and is substantially free of sulfur and other undesirable products.

As employed herein, "particle" takes on its traditional definition, e.g., Condensed Chemical Dictionary, 11th Edition, defines it as "a discrete unit of material". Although the properties of the particles, e.g., size, shape, moisture content, are not critical to the present invention, as will be seen the present invention preferably relates to particles having a fine size which are dry and free flowing. For sake of simplicity, "in a particle form" also refers to aggregates, e.g., tablets, of smaller particles.

Moreover, "substantially sulfur-free" refers to the lack of detectable turbidity when an Appearance on Solution, i.e., AOS, test of the product is preformed. In this AOS test, the ATS product is mixed into water, under ambient conditions, in an amount to provide a 20 wt % solution and the appearance thereof is visually judged with respect to turbidity. This test is discussed, for example, in ANSI specification PH4.250-1980. As discussed therein, to pass this test, the solution must be clear and free of sediment other than a slight flocculence. Moreover, in accordance with ANSI specification PH4.252-1980, this feature, i.e., lack of turbidity, is necessary for use of an ATS solution in photographic fixer environments. Typically, the amount of sulfur which can be tolerated is less than 0.02% by weight.

Among other factors, this absence of elemental sulfur is believed attributable to the fact that no substantial decomposition of ATS into elemental sulfur occurs during the production of this product. Thus, in another aspect, the present invention relates to a process for making an ATS product without substantial decomposition of the ATS. One embodiment of this process involves spray drying an aqueous solution containing ATS and certain stabilizers.

The ATS capable of being employed in this process includes commercial grade ATS solutions, e.g., those generally labelled "Ammonium Thiosulfate Solution, 58/60%, Photograde", which are available from, e.g., Hickson-Kerley, and Hoecsht AG among others.

Such ATS-containing solutions can include impurities such as ammonium sulfite which is typically present in an amount of about 1% by weight. Another impurity that may be present in commercial grade solutions is ammonium hydroxide, typically present in an amount of 0.3 to 0.6% by weight.

It is, of course, recognized that "pure" ATS solutions, i.e., solutions devoid of such impurities, can be employed in the process of the present invention.

One key aspect of this process is the presence, prior to drying, of effective stabilizing amounts of two components, i.e., a carbonate component and a sulfite component, in the solution.

In this regard, "stabilizing" amount is referring to an amount effective to provide a product which, upon drying, is substantially sulfur-free, i.e., there is no substantial decomposition of the ATS into sulfur during processing.

In this regard, the carbonate component is preferably present in an amount not greater than 10% by weight, more preferably not greater than 5% by weight and still more preferably, not greater than 1% by weight of the solution prior to spray drying. The sulfite containing component on the other hand is preferably present in an amount not greater than 5% by weight, more preferably, not greater than 2% by weight, and still more preferably, not greater than 1% by weight based upon the solution prior to spray drying. Moreover, each of the two components is preferably present in an amount not less than about 0.5% by weight.

The weight ratio of carbonate component(s) to sulfite component(s) in the invention is typically 1:2 to 3:1, and preferably about 3:2.

The carbonate component which can be employed in the present invention includes ammonium carbonate or bicarbonate, an alkali metal carbonate or bicarbonate, an alkaline earth metal carbonate or bicarbonate, and mixtures thereof.

Examples of suitable carbonate components are ammonium carbonate and sodium carbonate, with ammonium carbonate being preferred.

In this regard, the ability of the alkali and alkaline earth metal carbonates to be employed in the present invention can be illustrated by the following equilibrium reaction:

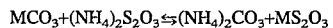

$$MCO_3 + (NH_4)_2S_2O_3 \rightleftharpoons (NH_4)_2CO_3 + MS_2O_3$$

However, as discussed above, ammonium carbonate is preferred in as far as the use of metal carbonates would introduce the resulting metal as an impurity into the final product. For example, the use of sodium carbonate would introduce an equimolar quantity of sodium thiosulfate into the final product.

The sulfite component which can be employed in the present invention include ammonium sulfite or bisulfite, alkali metal sulfite or bisulfite, alkaline earth metal sulfite or bisulfite, and mixtures thereof.

Preferred among such components are ammonium sulfite and sodium sulfite, with sodium sulfite being more preferred.

Due to practical and cost considerations, the components are preferably present in the following two combinations:

(1) the combination of an ammonium carbonate or bicarbonate and an alkaline earth or alkali metal sulfite or bisulfite; or (2) the combination of ammonium sulfite or bisulfite and an alkaline earth or alkali metal carbonate or bicarbonate.

However, other combinations of the two components can also be employed.

The ATS-containing solution can further include additional components, e.g., traditional components of photographic fixers. Such components include, but are not limited to:

(1) Thiosulfates such as alkali metal thiosulfates, and in particular, the sodium salt thereof; and (2) Complex formers such as ethylenediaminetetraacetic acid (ETDA) and gluconic acid.

The ATS-containing solution employed in the process of the present invention preferably has a pH of 0.5 to 8.0 with about 7.5 being preferred.

In this process, two components can be added separately or together, or, if the sulfite is already present in solution, only the carbonate component need be added. The solution is then dried so as to provide the desired ATS-containing product which is substantially sulfur-free. Although the present invention is discussed largely in terms of spray drying, other techniques for rapidly drying a solution such as freeze drying, and reduced pressure spray drying which are recognized in the art can be effectively employed. However, due to certain practical considerations, e.g., cost, spray drying is preferred.

Spray-drying as used herein can be accomplished according to standard art-recognized techniques. Suitable techniques in this regard include those described in K. Masters, SPRAY DRYING, 5th Ed., John Wiley & Sons, New York (1991).

As discussed, for example, on pages 64–66 of this treatise, a variety of processing conditions associated with spray drying are recognized in the art. These conditions include atomization, air flow, heat distribution, powder loading in the air flow, powder/air separation and the like. In the process of the present invention, suitable process conditions are those conditions which provide a product which is in particle form and which is substantially free of sulfur.

It is preferred to select suitable spray drying parameters so as to provide a powder of fine particles, e.g., less than 200 mesh, which is dry and free flowing and thus, can provide certain advantages in terms of handling and shipping of the material. Moreover, when spray drying is employed, the resulting particles are typically, substantially spherical in shape.

In this regard, "dry" refers to a moisture content of not greater than about 1% by weight. The preferred moisture content in this regard is about 0.3–0.5% by weight. Moreover, "free flowing" is referring to a dry product, e.g., powder, which is substantially free of any noticeable caking.

In the process of the present invention, from among typical process parameters associated with spray drying, the drying temperature at the dryer's inlet and in the drying chamber can be an important factor. For example, when employing a Swenson Power Dryer under spray drying conditions which have been capable of providing a dry, free flowing product, e.g., an air velocity of 1100–1200 m/min (3600–3900 fpm), air flow rate of 135–150 m$^3$/min (800–5200 scfm), retention time of from about 3 to about 5 seconds and a feed rate of about 2.0–2.5 l/min (33–40 gph), the drying temperature at the dryer inlet and in the drying chamber should be less than 150° C. and preferably between about 90° C. and 140° C.

In this regard, the use of gas inlet temperatures at the low end of the above range, e.g., about 90°–100° C., and a short retention time, e.g., 3–4 seconds, resulted in a good quality product while, at the same time, the use of a retention time in the higher end of the range, e.g., 4.9–5 seconds, and a higher inlet temperature, e.g., 140°–150° C. also was capable of providing a satisfactory product.

In producing the product, additional components can be introduced prior to drying, e.g., in the ATS-containing solution, or, can be introduced in a solid form, e.g., solid buffering agents, which can be added after spray drying.

That is, although the foregoing relates the inclusion of other components prior to spray drying, if one or more of the components are not introduced prior to spray drying, the resulting ATS powder can be subsequently mixed with other solid components suitable for the production of rapid photographic fixing formulations for photographic materials.

Where a bleaching-fixing bath is desired, bleaching agents can be included. Suitable bleaching agents include salts of EDTA, PDTA, and NTA, e.g., iron (III) complex salt of EDTA, of propylene diaminotetracetic acid (PDTA) or of a nitrilotriacetic acid (NTA). Such agents can be provided in powder form by means recognized in the art such as that discussed in U.S. Pat. No. 5,055,384.

Moreover, other components of such formulations which are alkaline or neutral can be added subsequent to drying. On the other hand, certain acidic materials, e.g., acidic powders, are not preferably introduced at this time because their inclusion may result in acid catalyzed disproportionation thereby reducing the shelf life of the composition. Accordingly, such acidic materials are typically introduced at the point of use of the ATS product.

The ATS-containing product, or blends thereof, or the fixer containing ATS can be directly packaged in any suitable packaging for powders, e.g., bags, or pouches, or the product can be formed, e.g., pressed, into suitable shapes, e.g., tablets or the like, prior to being packaged. The packages can then be sealed under art recognized conditions, e.g., under air, an inert atmosphere, or even a vacuum, by means recognized in the art.

After arriving at its point of use the packaged materials can be opened and dissolved in a suitable solvent, e.g., water, for forming the solution having fixing activity, e.g., a fixing or bleach-fixing solution.

In particular, due to the control of product properties, e.g., particle size, dryness and the like, that can be obtained through spray drying processes, the process of the present invention is capable of providing fine particles (e.g., smaller than 200 mesh) having an increased surface area as compared to those relatively dense particles produced by precipitation processes of the prior art. Due to such properties, the product can be rapidly dissolved in a suitable solvent, e.g., water, for forming the desired solution.

The so-prepared solution having fixing properties can then be employed in the processing of photographic light-sensitive materials in the same manner as traditional solutions.

In addition to be substantially sulfur-free, the product of the present invention has excellent shelf life and excellent solubility in, e.g., water. In this regard, the product of the present invention is capable of having improved shelf life in as far as aqueous thiosulfates are undesirably subjected to hydrolysis and disproportionation, catalyzed by light and air, thus yielding sulfur and sulfur dioxide. Such decomposition can be evidenced for example by an undesirable yellow turbidity appearing in the stored solution as well the odor of sulfur dioxide. The ability to effectively store the product in a dry state significantly slows such decomposition.

Moreover, because the preferred product is dry and free flowing, the material is easier to handle and cheaper to ship.

The present invention will now be described in terms of certain examples which are illustrative in nature and thus, should not be used to in any way limit the present invention.

EXAMPLES

Examples 1–15 illustrate a number of solutions according to the present invention. Comparative Examples 1–5 on the other hand illustrate certain solutions which do not contain one of the stabilizing components of the present invention, while Comparative Example 6 was spray dried at a temperature of 150° C.

In each case an ATS-containing solution was prepared from a commercial grade, 58/60% ATS solution containing 1% ammonium sulfite. In Examples 1–11, one or more of the carbonate and sulfite components set forth in Table I are introduced in the solution while Examples 12–15 are fixer blend solutions having the formulation set forth in Table II. In each case the resulting solution was spray dried, e.g., in a Swenson Power Dryer, a Bowen Power Dryer, or a Blaw-Knox Box Dryer, as illustrated by the drawing FIGURE.

All equipment in contact with feed and product is fabricated from stainless steel or Pyrex. The drying medium is filtered air plus products of combustion from the burning of natural gas.

The drying chamber, 1, is a double wall, vertical tube having a 4'-6" inside diameter. Filtered ambient air, 2, is drawn through steam heating coils, 3, and is then passed through a horizontal duct, 4, containing a hot wire anemometer for measuring air flow rate. The air is then delivered by the primary fan, 5, to a natural gas direct-fired air heater, 6. The heated air enters the top of the drying chamber through a distribution head.

The feed solution is recirculated in the feed tank, 7, and is delivered to the Triplex pump, 8, under pressure. Cooling water was circulated through the jacket of the feed tank.

A Triplex pump delivers feed to a single atomizing nozzle, 9, located in the top of the drying chamber. Feed is atomized into the drying air, and spray droplets and drying air proceed down the drying chamber cocurrently or in "parallel flow". The dried product at the bottom of the chamber is conveyed to two cyclones, 10, where it is separated from the exhaust drying air.

The product is discharged from the bottom of the primary cyclones is conveyed to the secondary cyclone collector, 11, where product is separated and discharged into the product drum, 12. The conveying air is then returned to the inlet of the primary collectors. A pneumatic vibrator was clamped to the 5" duct below the product cyclone to prevent bridging of material and pluggage of the cyclone or duct.

The spent drying and cooling air is drawn from the top of the cyclone collectors by a secondary fan, 13. The exhaust air is cleaned of fine particulates by wet scrubber, 14, before being discharged to the atmosphere.

The product produced in these examples had a particle size of less than 200 mesh, a bulk density of about 0.24 g/cm$^3$ and an angle of repose of 57°–59°.

The stability of the resulting product is then tested by the AOS test, i.e., the ATS powder is introduced into water in an amount effective to provide a 20 weight % solution and the visual appearance thereof is judged. In Table I, "OK" relates to a solution which had no noticeable turbidity, while "Decomp" designates to a solution having noticeable turbidity.

As can be seen, these examples illustrate the ability of the present invention to provide a dry, substantially sulfur-free ATS-containing powder.

TABLE I

| EXAMPLE | ATS | $(NH_4)_2CO_3$ | $(NH_4)_2SO_3$ | $Na_2SO_3$ | TEMP (°C.) | AOS TEST |
|---|---|---|---|---|---|---|
| 1 | 98.4 | 0.6 | 1 | 0 | 105 | OK |
| 2 | 98.4 | 0.6 | 1 | 0 | 110 | OK |
| 3 | 98.4 | 0.6 | 1 | 0 | 115 | OK |
| 4 | 97 | 2 | 1 | 0 | 110 | OK |
| 5 | 98 | 1 | 1 | 1 | 120 | OK |
| 6 | 95 | 3 | 1 | 1 | 93 | OK |
| 7 | 95 | 3 | 1 | 1 | 100 | OK |
| 8 | 95 | 3 | 1 | 1 | 105 | OK |
| 9 | 95 | 3 | 1 | 1 | 110 | OK |
| 10 | 95 | 3 | 1 | 1 | 120 | OK |
| 11 | 93 | 5 | 1 | 1 | 138 | OK |
| 12 | | FIXER BLEND | | | 105 | OK |
| 13 | | FIXER BLEND | | | 115 | OK |
| 14 | | FIXER BLEND | | | 127 | OK |
| 15 | | FIXER BLEND | | | 138 | OK |
| Comparative 1 | 99 | 0 | 1 | 0 | 102 | Decomp. |
| Comparative 2 | 99 | 0 | 1 | 0 | 126 | Decomp. |
| Comparative 3 | 99 | 0 | 1 | 0 | 135 | Decomp. |
| Comparative 4 | 99 | 0 | 1 | 0 | 147 | Decomp. |
| Comparative 5 | 99 | 0 | 1 | 0 | 155 | Decomp. |
| Comparative 6 | 93 | 5 | 1 | 1 | 150 | Decomp. |

TABLE II

FIXER BLEND FORMULATION

| COMPONENT | WT % |
|---|---|
| ATS | 50 |
| WATER | 41 |
| SODIUM THIOSULFATE | 5 |
| AMMONIUM CARBONATE | 2 |
| SODIUM SULFITE | 1 |
| CHELATES | 1 |
| TOTAL | 100 |

While the invention has been described in terms of various preferred embodiments, the skilled artisan will appreciate the various modifications, substitutions, omissions, and changes which may be made without departing from the spirit thereof. Accordingly, it is intended that the scope of the present invention be defined solely by the scope of the following claims including equivalents thereof.

We claim:

1. A process for producing an ammonium thiosulfate containing product comprising:
    (a) providing an aqueous solution containing ammonium thiosulfate and:
        (i) at least one carbonate component selected from among ammonium carbonate or bicarbonate, an alkali metal carbonate or bicarbonate, or an alkaline earth metal carbonate or bicarbonate; and (ii) at least one sulfite component selected from among ammonium sulfite or bisulfite, alkali metal sulfite or bisulfite, and alkaline earth metal sulfite or bisulfite; and (b) spray drying the solution wherein the amount of the carbonate component (i) is not less than about 0.5% by weight, the amount of the sulfite component (ii) is not less than 0.5% by weight and the amounts of the carbonate component (i) and sulfite component (ii) are selected so as to obtain a product that contains less than 0.02% by weight of sulfur.

2. The process according to claim 1 wherein the spray drying temperature is less than 150° C.

3. The process according to claim 1 wherein the spray drying temperature is between about 90° and 140° C.

4. The process according to claim 1 wherein the components (i) and (ii) are ammonium carbonate or bicarbonate and an alkali or alkaline earth metal sulfite or bisulfite, respectively.

5. The process according to claim 1 wherein the components (i) and (ii) are an alkali or alkaline earth metal carbonate or bicarbonate and an ammonium sulfite or bisulfite, respectively.

6. The process according to claim 1 wherein component (i) is present in an amount not greater than 5% by weight based upon the solution of (a).

7. The process according to claim 1 wherein the component (i) is present in an amount not greater than about 1% by weight based upon the solution of (a).

8. The process according to claim 1 wherein the component (ii) is present in amount not greater than about 2% by weight based upon the solution of (a).

9. The process according to claim 1 wherein the component (ii) is present in amount not greater than about 1% by weight based upon the solution of (a).

10. The process according to claim 1 wherein the aqueous solution of (a) further contains alkaline metal thiosulfates, complex formers, or mixtures thereof.

11. The process according to claim 1 wherein the components (i) and (ii) are either ammonium carbonate or bicarbonate and an alkali or alkaline earth metal sulfite or bisulfite, respectively, or an alkali or alkaline earth metal carbonate or bicarbonate and an ammonium sulfite or bisulfite, respectively, and further wherein the amount of components (i) and (ii) is not greater than about 5% and 2% by weight, respectively, based upon the solution of (a).

12. The process according to claim 1 further comprising:

(c) introducing additional photographic fixer components into the product, which fixer components are selected from among solid buffers, solid bleaching agents, or mixtures thereof.

13. The process according to claim 12 further comprising:

(d) introducing an effective amount of the product of (c) into water to provide a solution having fixing properties.

14. The process according to claim 13 further comprising:

(e) processing a light-sensitive material in the solution of (d).

15. An ammonium thiosulfate containing product which is substantially sulfur-free and which is produced by the process according to claim 1.

16. An ammonium thiosulfate containing product which is substantially sulfur-free and which is produced by the process according to claim 11.

* * * * *